F. A. DE ERB, Jr.
SMOKE CONSUMER.
APPLICATION FILED FEB. 9, 1918.

1,326,033.

Patented Dec. 23, 1919.
3 SHEETS—SHEET 1.

Inventor
F. A. De Erb, Jr.,

By
Attorney

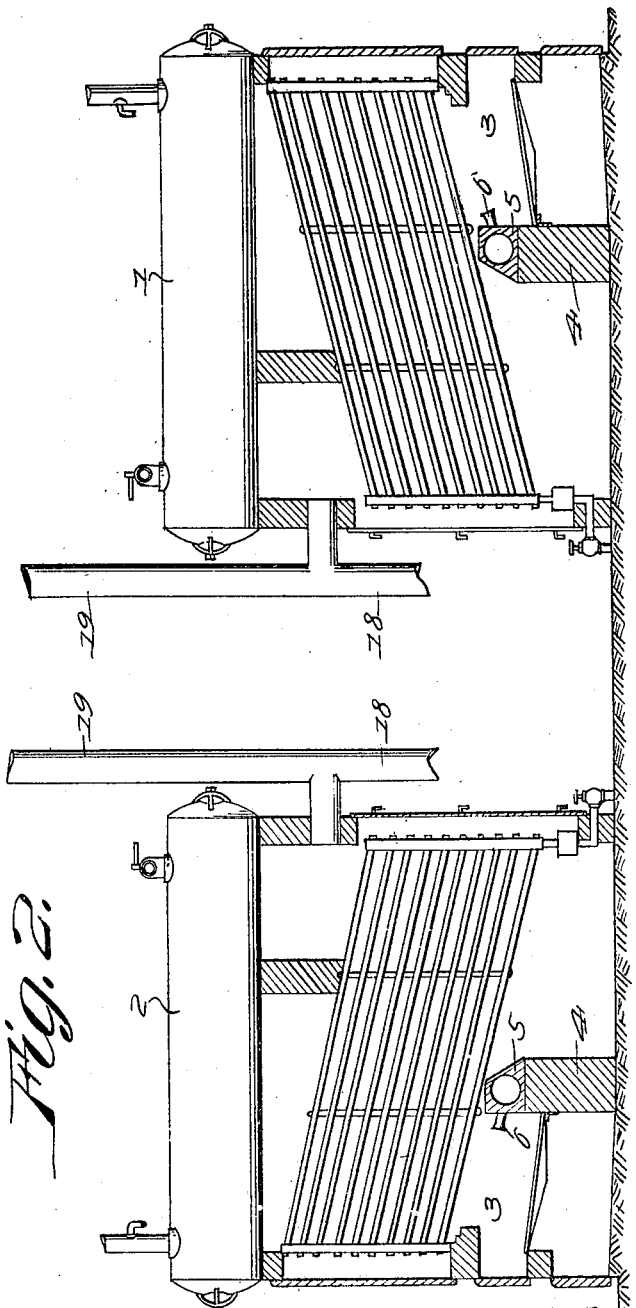

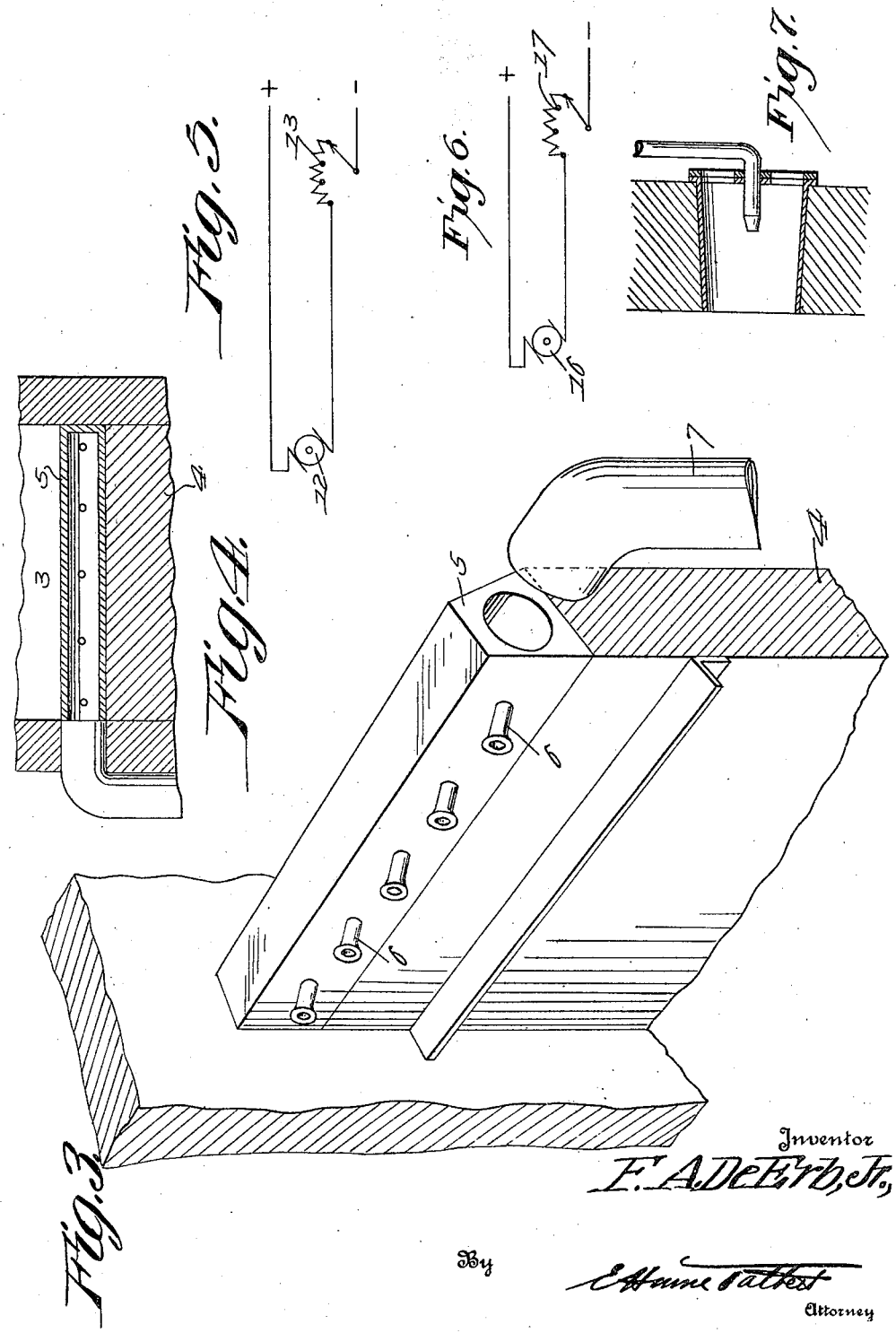

UNITED STATES PATENT OFFICE.

FRANCIS A. DE ERB, JR., OF HOMESTEAD, NEW JERSEY.

SMOKE-CONSUMER.

1,326,033.　　　　　　　Specification of Letters Patent.　　Patented Dec. 23, 1919.

Application filed February 9, 1918. Serial No. 216,241.

*To all whom it may concern:*

Be it known that I, FRANCIS A. DE ERB, Jr., a citizen of the United States of America, residing at Homestead, in the county of Hudson and State of New Jersey, have invented new and useful Improvements in Smoke-Consumers, of which the following is a specification.

The invention has general application to boilers and its principal object is to provide a means for so interconnecting the furnaces of a pair or plurality of boilers that all the carbon may be completely burned in the furnaces before the products of combustion are passed up the smoke stack.

The particular arrangement comprises a blower for creating a force draft in each furnace, a flue for each furnace which leads to the smoke stack and an induction fan conjoined with the flues. Draft tubes are connected with each fire box and interconnected among themselves and an air fan is arranged to take in air and mix it with the gas brought in by the induction fan, both these fans having connections with the draft tubes. Dampers are provided in the draft tubes, in the flues at a point above their connection with the furnace and also in the flues at the points where they are connected to the induction fan.

A further object of the invention is the provision of a casing to be positioned on the bridge wall of each furnace, with which casing the draft tube connects.

Other and further objects will be made to appear as the invention is set forth in detail in the following description. To the exact design and arrangement of boilers and furnaces in which it is shown and described, the invention is not to be confined. The actual practical application of the invention may show certain changes or alterations to be desirable and the right is claimed to make any which fall within the scope of what is claimed.

The same numerals of reference designate the same parts throughout the several figures of the drawings, wherein:

Fig. 2 is a longitudinal sectional view of the structure shown in Fig. 1.

Fig. 3 is a perspective view of the upper portion of the bridge wall of one of the boilers, showing the improved casing with which the gas and smoke burners are conjoined.

Fig. 4 is a longitudinal sectional view through the structure of Fig. 3.

Figure 1:
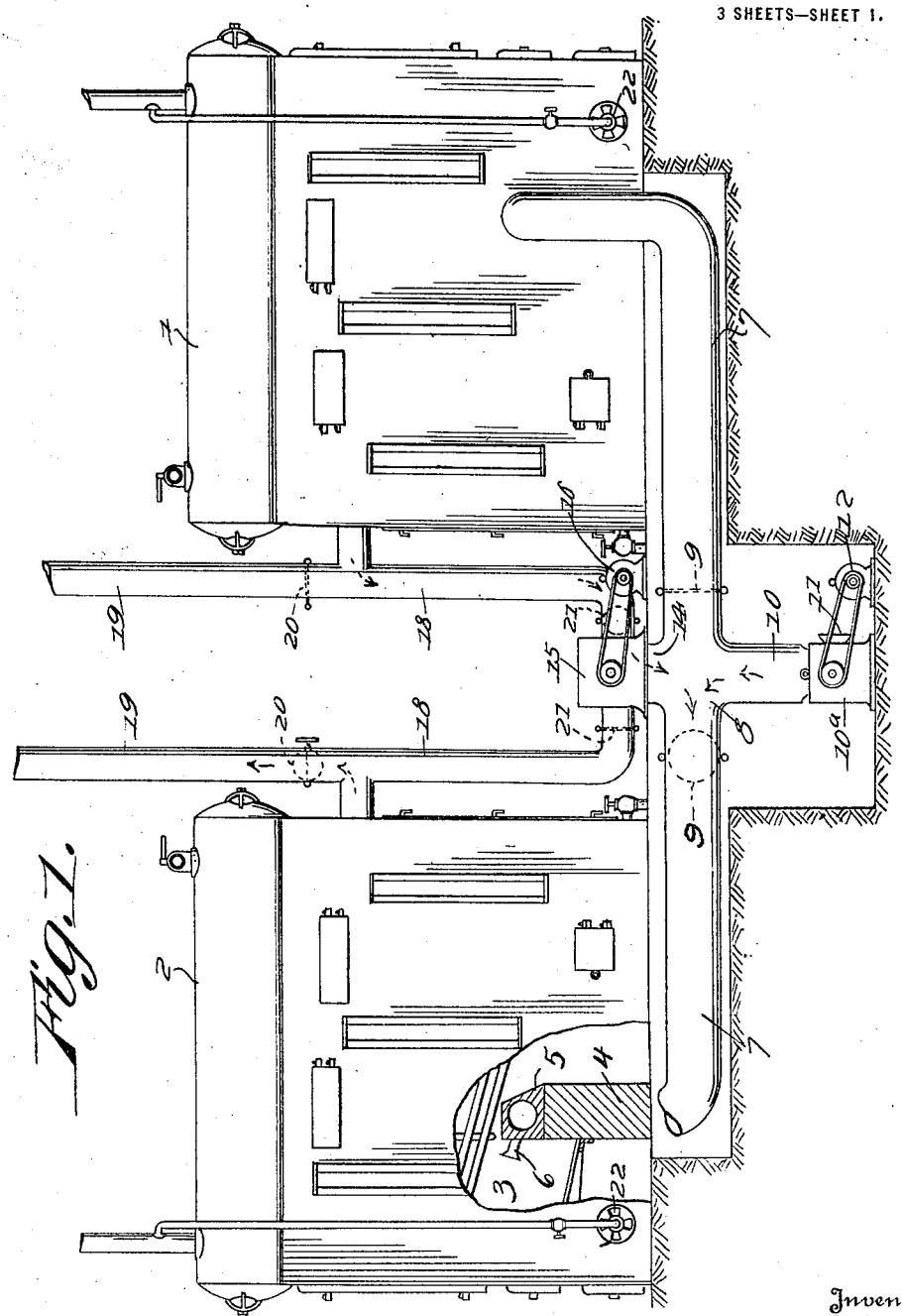
Figure 1 is a side elevation of two boilers provided with the fans and the connections between the furnaces which comprise this invention.

Figs. 5 and 6 are diagrammatic views of the controlling means for the blower motors 12 and 13 respectively.

Fig. 7 is a central vertical sectional view through one of the steam blowers provided for each furnace.

Referring to the drawings, there are shown boilers 1 and 2 which are conventional forms of water tube boilers having the fire boxes 3 at the back of each of which there is the usual bridge wall 4.

On top of the bridge wall there is positioned a casing 5 closed at one end and on three sides but having tubular cylindrical projecting members 6 on that face which overlooks the fire box, these tubular members 6 being inclined at a slight angle upward. The casing 5 is designed to be made of any suitable fire resisting material and the cylindrical members 6 communicate with its hollow interior.

In order to clearly illustrate the invention, the two boilers shown are placed back to back, the fire boxes of the two opening at opposite ends.

A draft tube 7 passes through the side wall of each furnace and connects with the open end of the casing 5, the two tubes 7 being led to a common juncture 8 and each being provided with a damper 9 adjacent the point of juncture.

Communicating with the draft tubes 7 at the point where they are joined, there is a tubular leg 10 and this leg connects with the air fan 10$^a$ in such a way that it will receive the peripheral discharge of the fan, the fan having an air inlet 11 provided for an intake. This fan 10$^a$ is designed to be run at different speeds by some such a mechanism as an electric motor 12 to which it is belted, a speed adjusting device 13 being included in circuit with the motor.

Connected also to the two tubes 7 at their point of juncture and by the tubular leg 14, there is a fan 15 from which the leg 14 receives the peripheral discharge. This fan also is run by a mechanism which will permit its speed to be varied such as an electric motor 16 which includes the speed adjusting device 17 in its circuit. Two tubes 18 connect with the fan 15 and these tubes connect one with each of the two flues 19 each of which is connected to the upper rear end of the furnace of one boiler in the usual way. The flues 19 are provided with dampers 20 adjacent their point of connection with the furnaces and these dampers are for the purpose of opening or closing the draft each from its particular furnace to the smoke stack (not shown).

Dampers 21 are positioned in the tubes 18 adjacent their points of connection with the fan 15.

Blowers 22 are provided for each fire box 3 and are so connected thereto that they may create a force draft in the fire boxes. These blowers are designed to permit their force to be varied and are intended to be the conventional form of steam blower ordinarily used with this particular style of boiler.

For the purpose of illustrating the operation of the invention, let it be assumed that the fire of the boiler 2 has been cleaned. A light covering of coal is placed on this fire and the blower 22 of the boiler 2 is then started and the force of the blower is regulated, so that the blower will supply only enough air to keep the fire bright. Let it be assumed now that the fire of the boiler 1 has been cleaned preparatory to receiving a fresh supply of coal. When this coal is put on the fire of the boiler 1, the combustion will not be rapid enough to completely consume the coal because of the lack of air to burn all the carbon in the coal. Therefore, were it not for the means which this invention provided, this carbon would pass out the flue 19 and through the stack causing black smoke and a waste of fuel which could economically be burned. Before placing the coal on the fire of the boiler 1, however, the damper 20 of the latter is closed and the damper 21 in the tube 18 connected with the furnace of the boiler 1 is opened, this regulation of the dampers, however, being made after the fan 15 is started and likewise the fan 10$^a$. The unburned carbon and gases from the new coal placed on the fire of the boiler 1 will then pass out from the furnace of the latter down through the pipe 18 through which it is drawn by the fan 15. This fan 15 will then discharge these unburned gases into the tube 7 of the boiler 2, the damper 9 of this tube having been opened and the corresponding damper of the other tube 7 having been closed. Before these gases are discharged into the tube 7 of the boiler 2, however, they are thoroughly mixed with air drawn in by the fan 10$^a$ and this mixture of air and gas passes through the tube 7 to the casing 5 of the boiler 2 where it is burned on issuing from the tubular members 6 connected with the casing 5.

The damper 20 of the flue 19 connected with the boiler 2, having been opened to permit the exit of the burned gases in the latter boiler when the blower 22 of this boiler was started, this flue also acts as a flue for the boiler 1 at the time of placing the fresh coal on the furnace of the latter.

After the fuel which was placed in the furnace of the boiler 1 has reached the stage when it would no longer make smoke (the fresh coal having changed to coke), the coke is broken up and leveled on the grate and thereafter completely burned leaving nothing but ash. While this coke under boiler 1 is being consumed, it is used to ignite the gases given off by the furnace of boiler 2 when the latter is supplied with a fresh charge of fuel, the regulation of the necessary dampers of the two boilers having been effected.

When the boiler 2 is to have its fire cleaned, the damper 20 connected with that boiler is closed and the corresponding damper of the boiler 1 opened. Likewise, the damper 21 connected with the boiler 1 is closed and the corresponding damper of the boiler 2 opened and the damper 9 of the boiler 2 closed and the corresponding damper 9 of the boiler 1 opened. Then the same cycle of operation recited above is repeated but reversed with respect to the boilers involved.

The invention having been described, what is claimed as new and useful is:

1. In combination with a pair of furnaces, an outlet flue connected with each furnace, a force draft blower discharging into each furnace, a draft tube interconnecting the furnaces, a fan discharging into the draft tube, a tubular connection leading from each flue to the intake of the fan whereby the gases from either furnace may be passed to the fan and thence through the draft tube to the other furnace and out through the flue of the latter, a damper in each flue between its outlet and its junction with its tubular connection, dampers in said tubular connections and positioned adjacent to the intake of the fan, and dampers in the draft tube positioned one on either side of the discharge of the fan.

2. In combination with a pair of furnaces, an outlet flue connected with each furnace, a force draft blower discharging into each furnace, a draft tube interconnecting the furnaces, a fan having its discharge connected with the draft tube, a tubular connection leading from each flue to the intake of said fan, an air fan discharging into the draft tube, a damper in each flue between its outlet and its junction with its tubular connection, dampers in the draft tube positioned one on either side of the discharge of the two said fans, and dampers in the tubular connection and positioned adjacent the intakes of the first said fan, whereby the gases from either furnace may be conducted to the other furnace for combustion in the latter and subsequently pass out the flue thereof.

3. In combination with a pair of furnaces, a flue connected with each furnace, a variable force draft blower discharging into each furnace, a draft tube interconnecting the furnaces, a fan having its discharge connected with the draft tube, a tubular connection leading from each flue to the intake of said fan, a damper in each flue between its outlet and its junction with its tubular connection, dampers in the tubular connections and positioned adjacent the intake of said fan and dampers in the draft tube and positioned on either side of the discharge of said fan, whereby the gases from either furnace may be conducted to the other for combustion and subsequently pass out the flue of the latter.

4. In combination with a pair of furnaces, an outlet tube connected with each furnace, a draft tube interconnecting the furnaces, a force draft blower discharging into each furnace, means for varying the force thereof, a fan connected with the draft tube for discharge thereinto, variable speed driving mechanism for the fan, a cold air fan discharging into the draft tube, a tubular connection leading from each flue to the intake of the first said fan, a damper in each flue between its outlet and its junction with its tubular connection, dampers in said tubular connections adjacent the intake of the first said fan whereby the gases from either furnace may be discharged into the draft tube and dampers in the draft tube on either side of the points of discharge of the aforesaid fans whereby the gases admitted to the draft tube may be directed to either furnace for combustion and final discharge through the flue thereof.

5. In combination with a pair of furnaces, an outlet flue connected with each furnace, a draft tube interconnecting the furnaces, a force draft blower discharging into each furnace, means for varying the force thereof, a fan connected with the draft tube for discharge thereinto, variable speed driving mechanism for the fan, a cold air fan discharging into the draft tube, a tubular connection leading from each flue to the intake of the first said fan, a damper in each flue between its outlet and its junction with its tubular connection, dampers in said tubular connections adjacent the intake of the first said fan, whereby the gases from either furnace may be discharged into the draft tube, and dampers in the draft tube on either side of the discharge of the aforesaid fans, whereby the gases admitted to the draft tube may be directed to either furnace for combustion and final discharge through the flue thereof.

In testimony whereof I affix my signature.

FRANCIS A. DE ERB, Jr.